No. 621,570. Patented Mar. 21, 1899.
P. JAEGER.
TOOL HANDLE AND MEANS FOR SECURING SAME.
(Application filed Sept. 10, 1898.)
(No Model.)
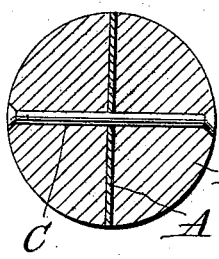
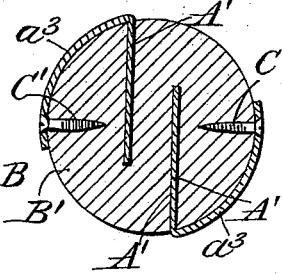
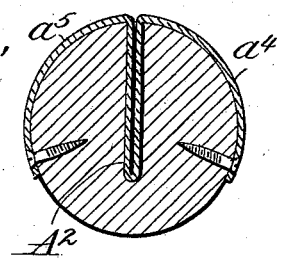
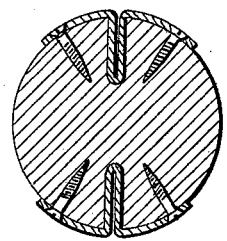
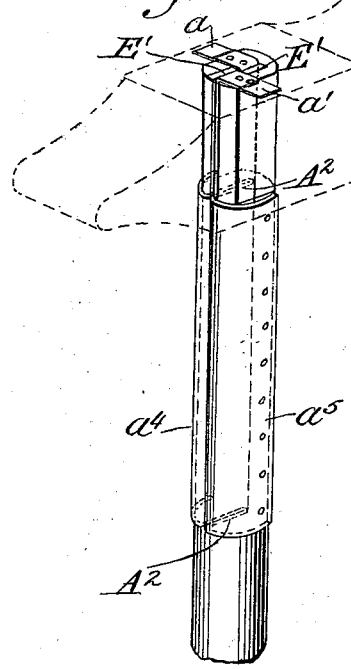
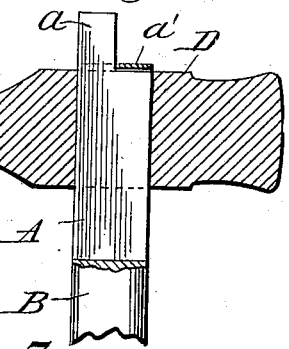
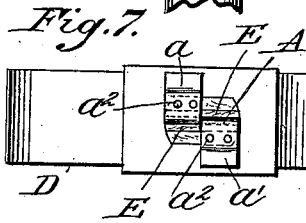
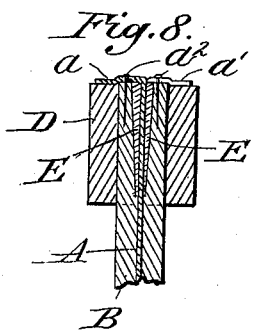
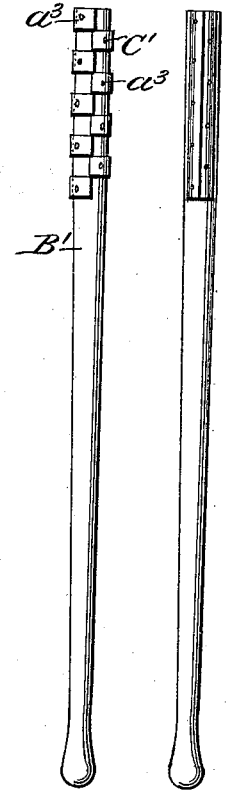
Witnesses
F. H. Schott
Anton A. Gloetzner
Inventor:
Paul Jaeger
by Max Engli
Attorney

UNITED STATES PATENT OFFICE.

PAUL JAEGER, OF ESSLINGEN, GERMANY.

TOOL-HANDLE AND MEANS FOR SECURING SAME.

SPECIFICATION forming part of Letters Patent No. 621,570, dated March 21, 1899.

Application filed September 10, 1898. Serial No. 690,665. (No model.)

*To all whom it may concern:*

Be it known that I, PAUL JAEGER, a citizen of the German Empire, residing at Esslingen, in the Kingdom of Würtemberg, Germany, have invented certain new and useful Improvements in Tool-Handles and Means for Securing the Same; and I do hereby declare the following to be a full, clear, and exact description of the invention, such as will enable others skilled in the art to which it appertains to make and use the same.

My invention relates to handles and means for securing tool-heads thereon.

The object of my invention is to provide means for strengthening wood shafts or handles of tools—such, for example, as hammers, shovels, scoops, and spades—by means of insertions of sheet metal at those portions which are most exposed to breakage. These insertions are more particularly intended to prevent shafts or handles made of soft kinds of wood, such as red beech, from breaking off.

A further object of my invention is to provide means for securing tool-heads to their shafts or handles.

With these objects in view my invention consists, first, in a strip of sheet metal inserted in a shaft or handle at the portion most exposed to breakage and provided with a flanged portion fitting against the outside of the said shaft or handle and secured to the same.

My invention consists, further, in a sheet-metal insertion which extends beyond that end of the shaft or handle which receives the tool-head, such projecting end being then turned down transversely of the shaft or handle.

My invention consists, furthermore, in the features, details of construction, and combination of parts, which will first be described in connection with the accompanying drawings and then particularly pointed out in the claims.

In the drawings, Figure 1 is a cross-section of a shaft or handle provided with an inserted strip of sheet metal; Fig. 2, a similar view showing a shaft or handle provided with two inserted strips of metal, which are flanged or bent into close contact with the outside of the handle; Fig. 3, a similar view of another modification of my invention; Fig. 4, a similar view of still another modification of my invention; Fig. 5, a perspective view of a hammer-handle provided with a strengthening-strip such as shown in Fig. 3, the end of strip being formed as a securing device for holding the hammer-head; Fig. 6, a sectional view, partly in elevation, of a hammer-handle provided with a strip of metal such as shown in Fig. 1, the said strip projecting beyond the tool-head and being bent down to hold said tool-head in place. Figs. 7 and 8 are plan and detail sectional views of the same. Figs. 9 and 10 are elevations of the constructions shown in Figs. 2 and 4, respectively.

Referring to Figs. 1, 6, 7, and 8 of the drawings, A is a flat metal strip inserted in a radial slot in the wooden shaft or handle B and secured to such shaft or handle by means of a suitable fastening device, such as the rivet C, Fig. 1. On the shaft or handle is placed a tool-head—for example, the hammer-head D. (Illustrated in Figs. 6, 7, and 8.) The end of the metallic strip A projects beyond the tool-head and is bent down across the end of the shaft or handle to form a device for securing the tool-head from coming off its handle. The said projecting end is preferably split longitudinally, one part being bent in one direction and the other in the opposite direction, as indicated at $a$ and $a'$, Figs. 6, 7, and 8. Furthermore, in order to swell the end of the handle and thereby make it fit tightly the eye of the tool I drive wedges E at each side of the metallic strip A at the end of the handle, as shown in Figs. 7 and 8, these wedges being retained in place by the downward-bent portions $a$ $a'$ of the metallic strip. These portions $a$ and $a'$, it is to be understood, project beyond the handle or shaft in order to rest against and hold in place the tool-head D. To assist in holding these laterally-projecting portions in the proper position, I secure them by means of nails $a^2$ to the end of the shaft or handle, as shown in Figs. 7 and 8.

In Fig. 2 a construction is shown in which two metallic strips A' are inserted, each having a flanged portion $a^3$, which is bent into close contact with the outside of the shaft or handle B', to which it is secured in any suitable manner, as by screws C'. Instead of bending this flanged portion in one direction only it may be slit transversely to form tongues $a^4$, which may be bent alternately in opposite directions, as shown in Fig. 9, each tongue being secured in close contact with the outside of the shaft or handle by means of screws.

In Figs. 3 and 5 a construction is shown in which that portion of the metallic strip $A^2$ which enters the slot in the handle or shaft is doubled, each half of the strip (in width) having a flanged portion which is bent into close contact with the outside of the shaft, the flanged portion $a^4$ of one half of the strip extending in direction opposite to that of the other half, $a^5$, of the strip.

In Figs. 4 and 10 I have illustrated a somewhat similar construction, in which two strengthening-strips are employed, each being smaller than that illustrated in Figs. 3 and 5 and applied to opposite sides of the shaft or handle, the latter being provided with two slots, one at each side, which slots extend toward each other, as shown in Fig. 4.

In all these constructions it is important that the metallic strip extend not only along that portion of the shaft or handle which receives the tool-head, but also beyond the same. In other words, when the shaft is used as a hammer-handle, as shown in Fig. 5, the handle is slotted not only at that part which enters the eye of the hammer, but also below the same for a substantial distance toward the handle proper of the shaft. The reason for this is that the greatest danger of breakage of the shaft or handle occurs principally at that part of the shaft outside of yet near the head. It is to be understood, moreover, that in the forms of strengthening-strips shown in Figs. 2, 3, and 4 the said strips may have their ends lengthened, so as to project beyond the tool-head and bent down upon the latter to secure it to its handle or shaft. This is illustrated in Fig. 5. Furthermore, the wedges previously described in connection with Figs. 1, 6, 7, and 8 may be used with any of the forms of strengthening-strips. For example, Fig. 5 shows wedges E' used in connection with the form of strengthening-strip shown in Fig. 3.

Having thus fully described my invention, what I claim as new, and desire to secure by Letters Patent, is—

1. The combination with a handle or shaft of wood arranged to receive a tool-head and provided with a longitudinal slot extending through the portion which receives the tool-head and also beyond said portion, said slot extending transversely from the outside of said handle toward its interior, of a flat metal strip fitting in the said slot and provided with a flanged exterior portion fitting against the outside handle or shaft.

2. The combination, with a tool-head, and a handle or shaft of wood arranged to receive the said tool-head, said handle or shaft having a slot extending longitudinally of the handle or shaft at the portion which receives the tool-head and also beyond said portion, said slot extending transversely from the outside of the handle or shaft toward its interior, of a flat metal strip fitting into said slot and provided with a flanged exterior portion which fits against the outside of the handle or shaft and is secured thereto.

3. The combination, with a handle or shaft of wood, and a tool-head fitted over the end of the same, of a flat metal strip inserted radially into the handle or shaft a substantial distance and projecting beyond the end of said shaft, the projecting end being bent down on the shaft at right angles and engaging the tool-head, means for securing the metal strip to the handle inside the tool-head and means for securing the projecting end of the strip to the end of the shaft.

4. The combination, with a handle or shaft of wood, and a tool-head fitting over the end of the same, of a flat metal strip inserted radially into the handle or shaft a substantial distance, and projecting beyond the end of said handle, the projecting end being bent down on the handle at right angles and secured thereto by means of screws or rivets, and wedges driven into the handle on opposite sides of said strip.

In testimony whereof I affix my signature in presence of two witnesses.

PAUL JAEGER.

Witnesses:
S. HÜNERBERG,
H. WAGNER.